United States Patent [19]

Barton, Jr. et al.

[11] Patent Number: 4,573,091
[45] Date of Patent: Feb. 25, 1986

[54] CARTRIDGE TAPE DRIVE

[75] Inventors: William M. Barton, Jr., Encinitas; John F. Murphy; Karl B. Offerman, both of San Diego; Richard G. Fisher, Torrance, all of Calif.

[73] Assignee: Cipher Data Products, Inc., San Diego, Calif.

[21] Appl. No.: 441,762

[22] Filed: Nov. 15, 1982

[51] Int. Cl.[4] .................. G11B 5/008; G11B 15/00; G11B 17/00
[52] U.S. Cl. .................................. 360/93; 360/96.5; 360/105
[58] Field of Search ................. 360/96.5, 93, 85, 105

[56] References Cited

U.S. PATENT DOCUMENTS

| | | | |
|---|---|---|---|
| 3,692,255 | 9/1972 | Von Behren | 242/192 |
| 3,924,823 | 12/1975 | Cohen et al. | 242/198 |
| 3,947,883 | 3/1976 | Suzuki | 360/96.5 |
| 3,949,951 | 4/1976 | Porter, Jr. et al. | 242/192 |
| 3,959,821 | 5/1976 | Nardino | 360/96 |
| 3,964,098 | 6/1976 | Kramer et al. | 360/93 |
| 3,976,262 | 8/1976 | Kennedy | 360/96.5 X |
| 3,977,625 | 8/1976 | Maxwell, Jr. et al. | 242/198 |
| 3,987,486 | 10/1976 | Ito et al. | 360/96 |
| 4,085,906 | 4/1978 | Dahl et al. | 242/192 |
| 4,099,686 | 7/1978 | Moya | 242/198 |
| 4,101,949 | 7/1978 | Cicatelli | 360/137 |
| 4,156,260 | 5/1979 | Joshi | 360/96.1 |
| 4,161,007 | 7/1979 | Haraguchi | 360/137 |
| 4,188,647 | 2/1980 | Tanaka | 360/105 |
| 4,199,795 | 4/1980 | Hunter | 360/93 |
| 4,216,508 | 8/1980 | Hunter | 360/93 |
| 4,303,955 | 12/1981 | Kramer et al. | 360/93 |
| 4,337,908 | 7/1982 | Sims, Jr. | 242/198 |
| 4,344,097 | 8/1982 | Takai | 360/93 X |
| 4,361,859 | 11/1982 | Schatteman | 360/96.5 |
| 4,489,355 | 12/1984 | Rudi | 360/96.5 |

FOREIGN PATENT DOCUMENTS

| | | |
|---|---|---|
| 2823226 | 11/1978 | Fed. Rep. of Germany . |
| 2214933 | 1/1973 | France . |
| 822012 | 11/1974 | France . |
| 2353114 | 12/1977 | France . |
| 2482758 | 11/1981 | France . |
| WO82/03939 | 11/1982 | PCT Int'l Appl. . |
| 1567864 | 5/1980 | United Kingdom . |

OTHER PUBLICATIONS

San Diego Business Journal, Aug. 23, 1982, pp. 6-7; C. Kraul; "DEI, Cipher Data Programmed for Tape Drive Competition".

Primary Examiner—A. J. Heinz
Attorney, Agent, or Firm—Baker, Maxham, Callan & Jester

[57] ABSTRACT

A drive for a tape cartridge having an access door along one side edge thereof. The drive includes a housing having a front panel and an elongate tray dimensioned to have the cartridge inserted endwise thereon. The tray is supported within the housing for longitudinal movement from a retracted position in which the tray is substantially contained within the housing to an extended position in which a portion of the tray extends through a slot in the front panel of the housing. A mechanism is provided for opening the access door of the cartridge while the cartridge is supported on the tray and the tray is being moved from its extended position to its retracted position. Another mechanism is provided for moving a read/write head and a capstan drive within the housing between operative engagement and disengagement with the cartridge after the cartridge has been inserted onto the tray and the tray has been moved to its retracted position.

17 Claims, 20 Drawing Figures

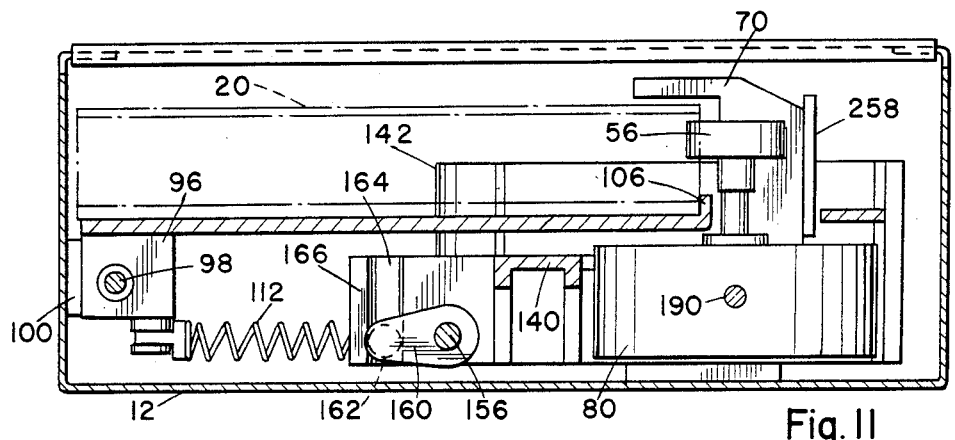
Fig. 11
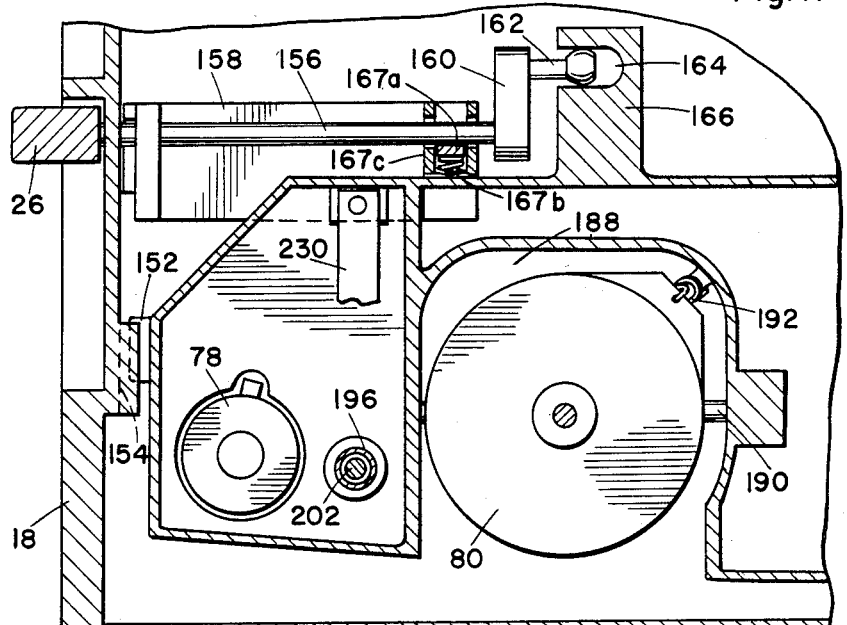
Fig. 12
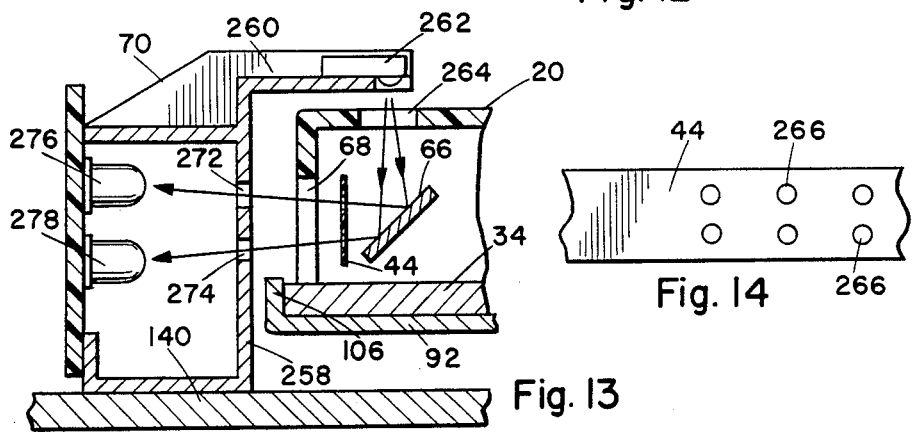
Fig. 13
Fig. 14

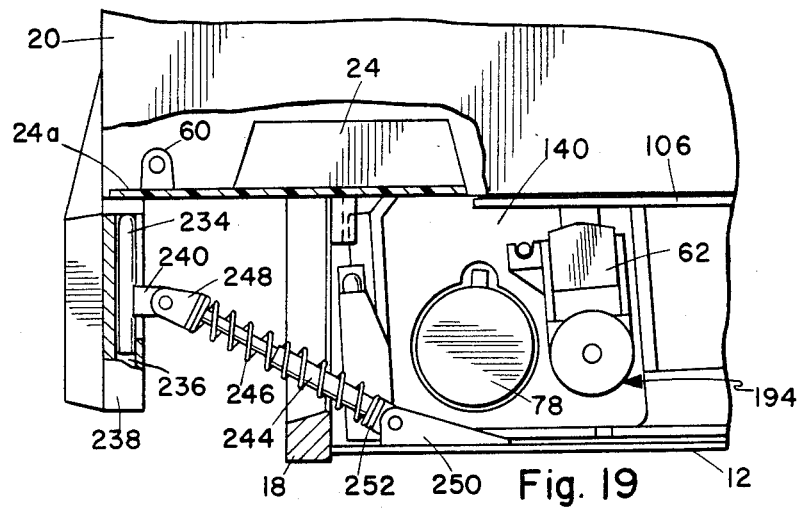
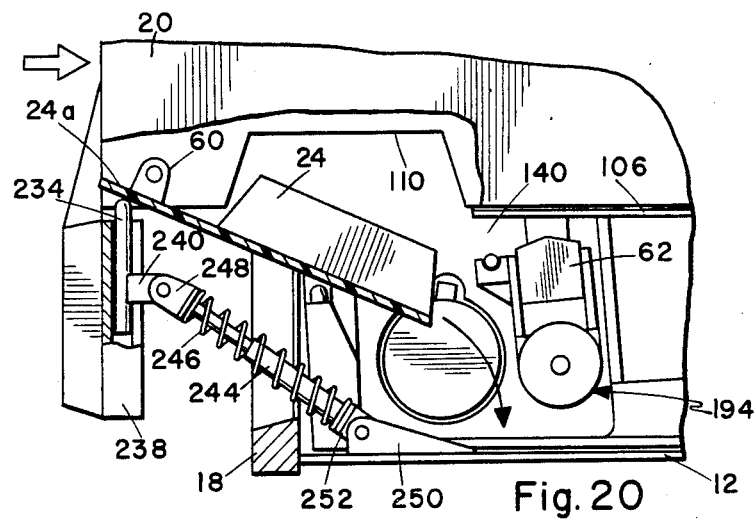

CARTRIDGE TAPE DRIVE

BACKGROUND OF THE INVENTION

The present invention relates to magnetic drives, and more particularly, to a magnetic tape drive for storage and retrieval of digital data in which a tape cartridge is endwise loaded onto a tray which is thereafter slid into a housing.

The five and one-quarter inch Winchester disk drive which provides substantial storage capacity and rapid data access is becoming increasingly popular as a principal memory for personal and small business computers, which until recently, used exclusively flexible or floppy disk memories. A five and one-quarter inch Winchester disk drive may have a memory storage capacity of, for example, fifty-five megabytes. On the other hand, a typical floppy disk drive may have a storage capacity of only one-quarter megabyte.

Many computer systems have backup memory devices to assure against malfunctions or physical damage that could destroy the principal data bank. In the past, in personal and small business computer systems, the backup storage unit has typically consisted of a second floppy disk drive. However, the increasing use of five and one-quarter inch Winchester disk drives in personal and small business computers has created a need for greater backup storage. Floppy disk drives are unsuitable for use as backup storage for a five and one-quarter inch Winchester disk drive because the hard disk stores many times more information than a single floppy disk. For example, forty one-quarter megabyte floppy disks would be needed to backup one ten megabyte Winchester disk drive, making backup storage a time-consuming inconvenience for the operator.

A magnetic tape drive would be a more practical form of backup storage for the five and one-quarter inch Winchester disk drive. Such tape drive would preferably utilize a tape cartridge for convenience and durability. ANSI X3.55-1977 defines a standard one-quarter inch tape cartridge to facilitate industry compatability. One cartridge meeting this standard is the DC300XL cartridge manufactured by Minnesota Mining and Manufacturing. See U.S. Pat. No. 3,692,255. That cartridge measures approximately six inches in length and four inches in width. In addition, the cartridge has a door along one of its longer sides which must be swung open so that the tape drive head can make contact with the tape. This door, when fully open, increases the width of the cartridge from approximately four inches to approximately five and three-quarter inches.

Currently floppy disk drives and five and one-quarter inch Winchester disk drives are constructed to meet an industry standard which requires that they fit within a rectangular box measuring approximately three and one-quarter inches in height by five and three-quarter inches in width by eight inches in length. The foregoing dimensions are hereinafter referred to as the five and one-quarter inch form factor for a mechanical transport. It would be desirable to provide a magnetic tape drive which would fit the foregoing industry mechanical form factor while utilizing the aforementioned 3M cartridge. The magnetic tape transport could then be inserted into the same physical enclosure or hardware designed to receive the five and one-quarter inch Winchester or floppy disk drives.

It is difficult to provide a magnetic tape drive which can receive and utilize the aforementioned 3M tape cartridge in the relatively small industry mechanical form factor. Because the cartridge is six inches in length, it cannot be loaded sideways into such a magnetic tape transport since the width of the mechanical form factor is only five and three-quarter inches. If the tape transport were installed in a receptacle within a mini-computer, there would be no access to the side of the tape drive unless the tape drive could be slid out of the mini-computer. Such sliding out of the entire drive would be undesirable since it would expose sensitive electronic and mechanical components of the drive to possible damage and contamination. Furthermore, such sliding out of the entire drive would require flexible busses and connectors which could fail with repeated use. Accordingly, it would be preferable to load the cartridge endwise into the tape drive. This presents a problem since the width of the cartridge is approximately five and three-quarter inches with the door fully open. Some mechanism would have to provided for opening the door of the cartridge and engaging the head with the tape in an extremely confined amount of space.

SUMMARY OF THE INVENTION

Accordingly, it is the primary object of the present invention to provide an improved cartridge tape drive.

Another object of the present invention is to provide an improved cartridge tape drive adapted to have a cartridge, with a tape access door, endwise loaded therein.

Another object of the present invention is to provide a tape drive of the aforementioned type having a mechanism for opening the tape access door of the cartridge during insertion of the cartridge into the drive.

Another object of the present invention is to provide a tape drive of the aforementioned type which can be loaded and unloaded in a manner similar to that of a floppy disk drive.

Another object of the present invention is to provide a tape drive of the aforementioned type in which the head and capstan drive are moved into engagement with the cartridge after the cartridge has been fully inserted into the drive.

Still another object of the present invention is to provide a tape drive of the aforementioned type which will fit within the industry three and one-quarter inch by five and three-quarter inch by eight inch form factor while accommodating endwise loading of a standard cartridge defined by ANSI standard X3.55-1977.

Accordingly, the present invention provides a drive for a tape cartridge having an access door along one side edge thereof. The drive includes a housing having a front panel and an elongate tray dimensioned to have the cartridge inserted endwise thereon. The tray is supported within the housing for longitudinal movement from a retracted position in which the tray is substantially contained within the housing to an extended position in which a portion of the tray extends through a slot in the front panel of the housing. A mechanism provided for opening the access door of the cartridge while the cartridge is supported on the tray and the tray is being moved from its extended position to its retracted position. Another mechanism is provided for moving a read/write head and a capstan drive within the housing between operative engagement and disengagement with the cartridge after the cartridge has been inserted onto the tray and the tray has been moved to its retracted position.

BRIEF DESCRIPTION OF THE DRAWINGS

FIG. 11 is a vertical sectional view of the preferred embodiment taken along Line 11—11 of FIG. 10.

FIG. 12 is a fragmentary, horizontal sectional view of the preferred embodiment taken along Line 12—12 of FIG. 9.

FIG. 13 is an enlarged, vertical sectional view taken along Line 13—13 of FIG. 9 illustrating the mechanism which is utilized to sense the beginning of the magnetic tape and the end of the magnetic tape during operation of the tape drive.

FIG. 14 illustrates a portion of the magnetic tape which has the end indicating perforations.

FIGS. 19 and 20 are sequential views illustrating the manner in which the tape cartridge door is gradually opened as the tray carrying the cartridge is inserted into the main portion of the drive to its final position illustrated in FIG. 7.

DESCRIPTION OF THE PREFERRED EMBODIMENT

Figure 1:
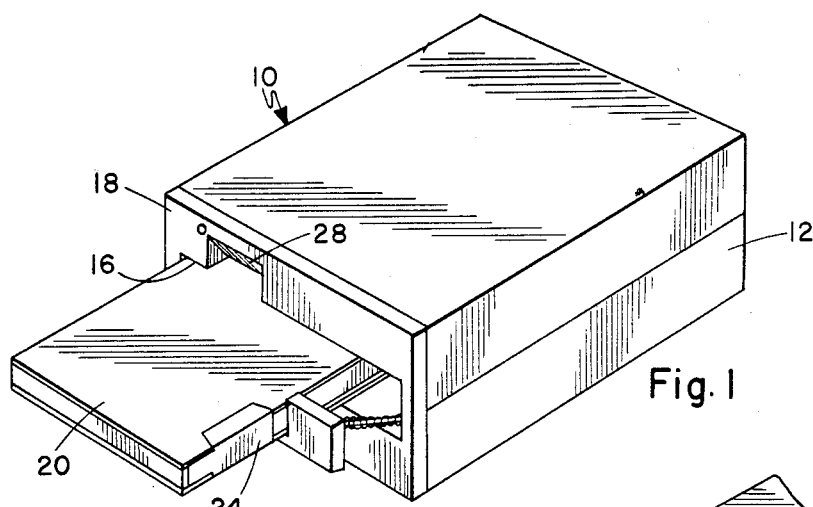
FIG. 1 is a perspective view of a preferred embodiment of the cartridge tape drive with its tray extended and a cartridge partially inserted.

Referring to FIG. 1, the preferred embodiment 10 of the cartridge tape drive has a rectangular housing 12 whose width, height and length are such that the housing will fit within the industry form factor for five and one-quarter inch Winchester disk drives and floppy disk drives.

A completely enclosed housing is not necessary where the drive is installed in a receptacle in a computer. Accordingly, the term "housing", as used herein, refers to any general support structure or frame for mounting the components of the drive in operative relationship. The term "within the housing" refers to something being located generally within the side edge boundaries of the frame or support structure. A horizontal tray 14 (FIGS. 2 and 3) slides partially out of the tape drive through a slot 16 formed in a front panel 18 of the housing. An LED 19 is mounted in the front panel to indicate the drive select status. The tray is dimensioned for receiving a magnetic tape cartridge 20 which is loaded endwise therein. The tape cartridge 20 is preferably of the type which meets ANSI specification X3.55-1977. One such cartridge is the model DC300XL sold by Minnesota Mining and Manufacturing.

Figures 2, 3:
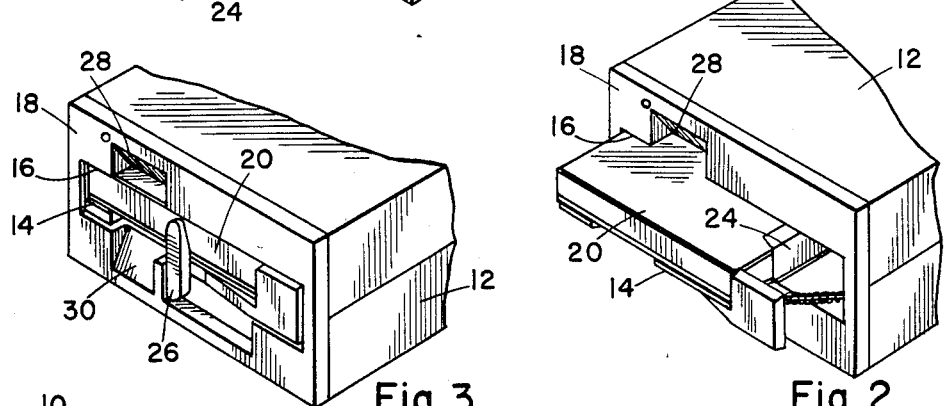
FIG. 2 is a perspective view of the preferred embodiment with the cartridge fully inserted into the tray.
FIG. 3 is a perspective view of the preferred embodiment with the tray closed and locked.

The cartridge 20 is slid fully into the tray 14 as illustrated in FIG. 2 so that the end edges of the cartridge coincide with the end edges of the tray. Thereafter, continued pushing on the cartridge 20 causes the tray to slide rearwardly until both the tray and the cartridge are entirely within the housing as illustrated in FIG. 3.

Figure 4:
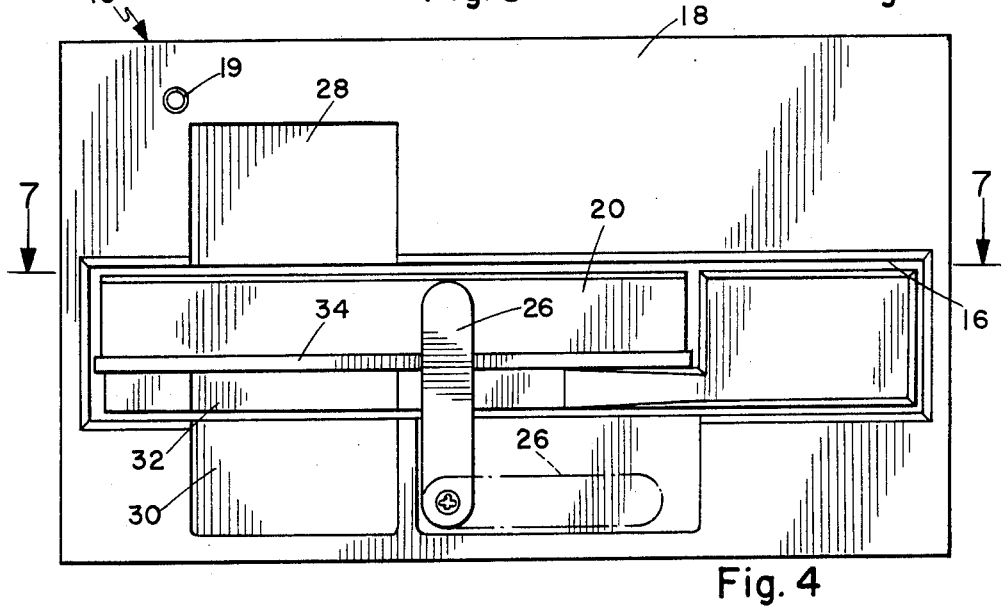
FIG. 4 is an enlarged front-end elevation view of the preferred embodiment of the cartridge tape drive.

During this loading of the cartridge, mechanisms hereafter described in greater detail, open the door 24 which is hingedly attached to one side edge of the tape cartridge 20. During the insertion of the cartridge, an upper cartridge inspection guide is lifted clear of the tape cartridge door. Once the cartridge is fully loaded into the drive, a load lever 26 (FIG. 3) is rotated approximately ninety degrees into a vertical position. Through a linkage this causes a magnetic read/write head, a capstan drive, and cartridge location pins to move into engagement with the tape cartridge as described hereafter in greater detail. The unlocked and locked positions of the load lever 26 are illustrated in phantom lines and solid lines, respectively, in FIG. 4. Detents and recesses, not illustrated, may be provided on the lever 26 and front panel 18 so that the load lever 26 snaps into its unlocked and locked positions.

The front panel 18 of the tape drive is formed with upper and lower, inwardly tapering finger recesses 28 and 30 (FIG. 4) on either side of the slot 16. A similar recess 32 (FIG. 8) is formed in the forward end of the tray 14, in alignment with the finger recesses 28 and 30. These finger recesses permit an operator to grasp the end of the tape cartridge 20 between his or her thumb and index finger and to remove the cartridge from the tray. The load lever 26, after it is rotated to its locked position shown in solid lines in FIG. 4, blocks the entry slot 16. This lever thus produces assurance of full tray entry and also provides a visual cartridge loaded indicator.

Figure 5:
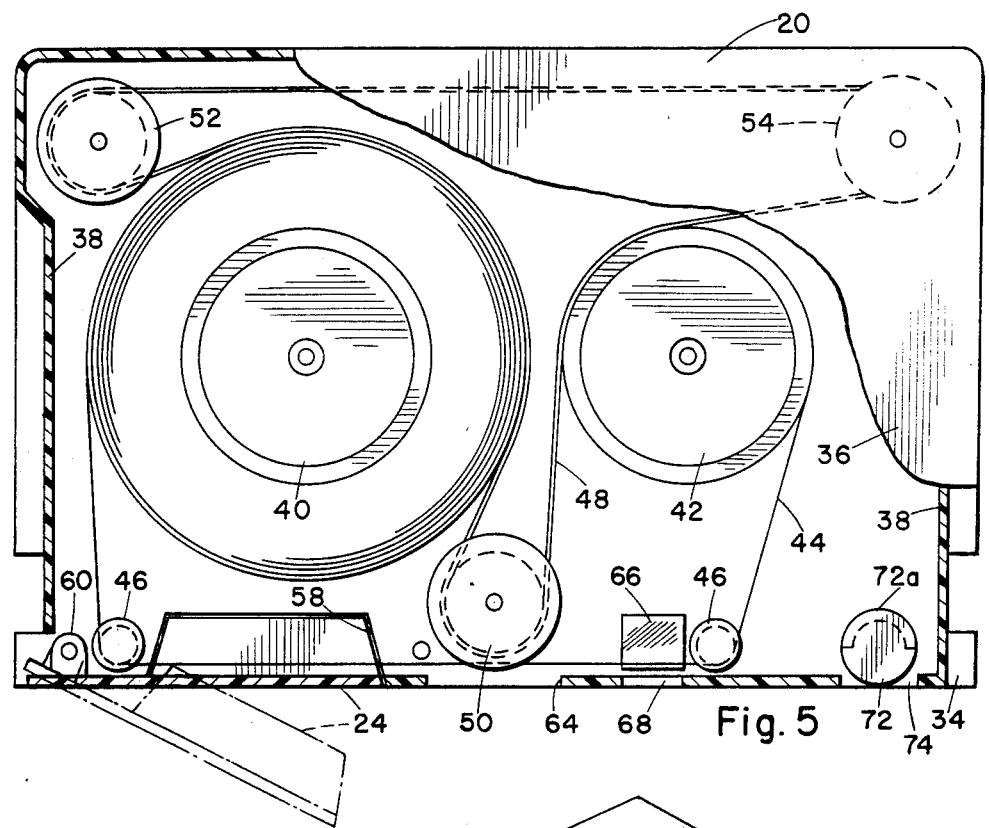
FIG. 5 is a top plan view of the tape cartridge with portions cut away and showing the open position of its access door in phantom lines.

Details of the conventional tape cartridge 20 are illustrated in FIG. 5. That cartridge measures approximately six inches in length and four inches in width. The door 24 of the cartridge increases the width of the cartridge to approximately five and three-quarter inches when the door is fully opened. The cartridge has a solid metal base plate 34, and a top cover 36. The end walls 38 of the cartridge are slightly indented from the end edges of the plates 34 and 36. A pair of reels 40 and 42 are rotatably mounted within the cartridge between the plates 36 and 38. A length of magnetic tape 44 is wound back and forth between the reels around a pair of idler rollers 46. A drive belt 48 is driven around three separate rollers, 50, 52 and 54. When the belt capstan roller 50 is rotated by a capstan drive roller 56 (FIG. 6) the drive belt 48 rotates the reels 40 and 42 so that the magnetic tape is unwound from one of the reels and rewound onto the other reel.

The cartridge 20 has a cut-out region 58 along one side edge thereof which is conformably shaped for receiving the door 24. The door 24 is pivotally connected to the corner of the cartridge 20 by a hinge assembly 60. As previously indicated, when the tape cartridge 20 is inserted into the drive, mechanisms open the door 24 of the cartridge. Thereafter, rotation of the load lever 26 brings a read/write head 62 (FIG. 6) into the cut-out region 58 so that the head can make contact with the tape 44 as illustrated in FIG. 6.

Rotation of the load lever also brings the capstan drive roller 56 (FIG. 6) into a cut-out region 64 and into contact with the belt capstan roller 50. As best seen in FIG. 5, the belt capstan roller 50 has an upper larger portion and a lower smaller portion illustrated in phantom lines. The larger portion of the drive belt capstan 50 extends above and beyond the magnetic tape 44 so that the capstan drive roller 56 can engage the belt capstan roller without touching either the tape 44 or the drive belt 48.

The cartridge 20 also has a mirror 66 (FIG. 5) positioned behind a window 68 which is utilized in connection with an end of tape/beginning of tape (EOT/BOT) sensing mechanism 70 in the tape drive. The cartridge 20 also has a file protect mechanism consisting of a rotatable half cylinder 72 (FIG. 5) positioned in front of a cut-out region 74. A file protect sensor 76 (FIG. 6) determines whether or not the cut-out region 74 is blocked by the semi-circular portion 72a of the file protect cylinder.

Figure 6:
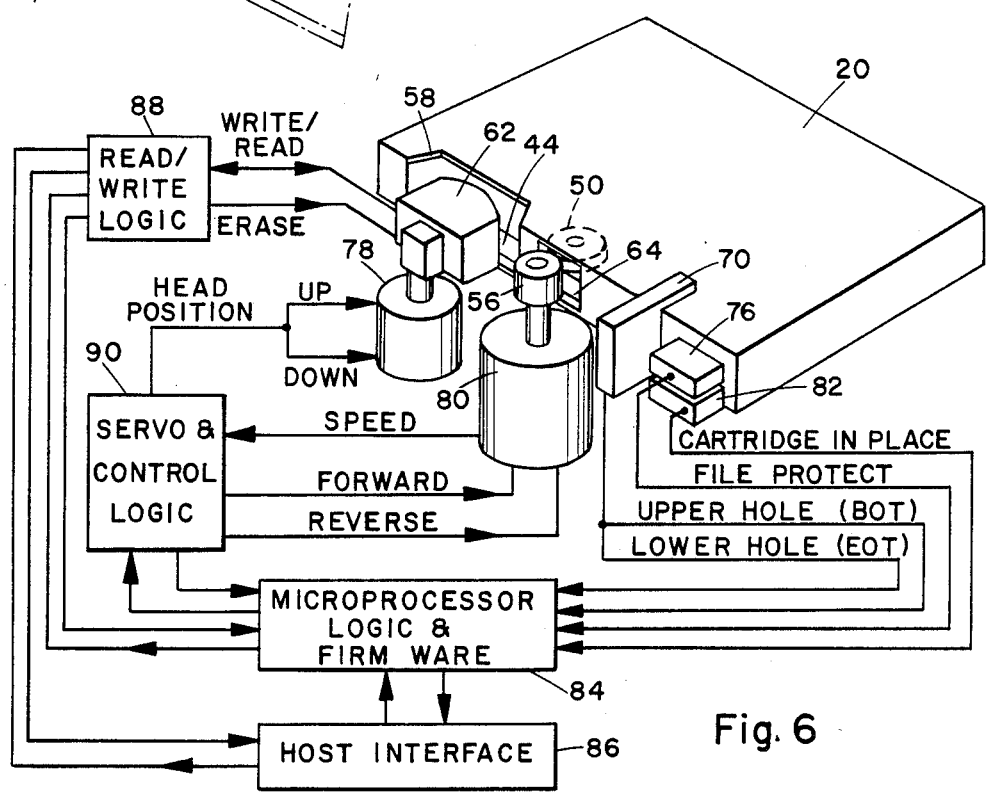
FIG. 6 is a schematic illustration of the control system of the tape drive and the manner in which its capstan drive and head engage the tape cartridge.

Referring to FIG. 6, the read/write head 62 is vertically reciprocable by energizing a stepper motor 78 to select any one of twelve different tracks on the tape. The capstan drive roller 56 is mounted on the upper end of the shaft of a brushless DC motor 80. A sensor 82 is mounted in the tape drive adjacent the file protect sensor 76 and is utilized to detect when a cartridge is in place within the drive.

FIG. 6 also illustrates the control circuitry of the tape drive, details of which are not the subject of the present application. This circuitry is mounted on one or more PC boards (not shown) which are positioned horizontally above the cartridge within the housing. The control system includes a microprocessor, logic and firmware denoted 84 in FIG. 6. A host interface 86 is provided for enabling communication between a computer or other source of data. Read/write logic 88 is connected between the head 62 on the one hand and the microprocessor 84 and host interface 86 on the other hand. The head 62 also functions to erase blocks of data from the tape 44 under control of the read/write logic 88. The microprocessor controls the stepper motor 78 and the brushless DC motor 88 through a servo and control logic 90.

Figure 7:
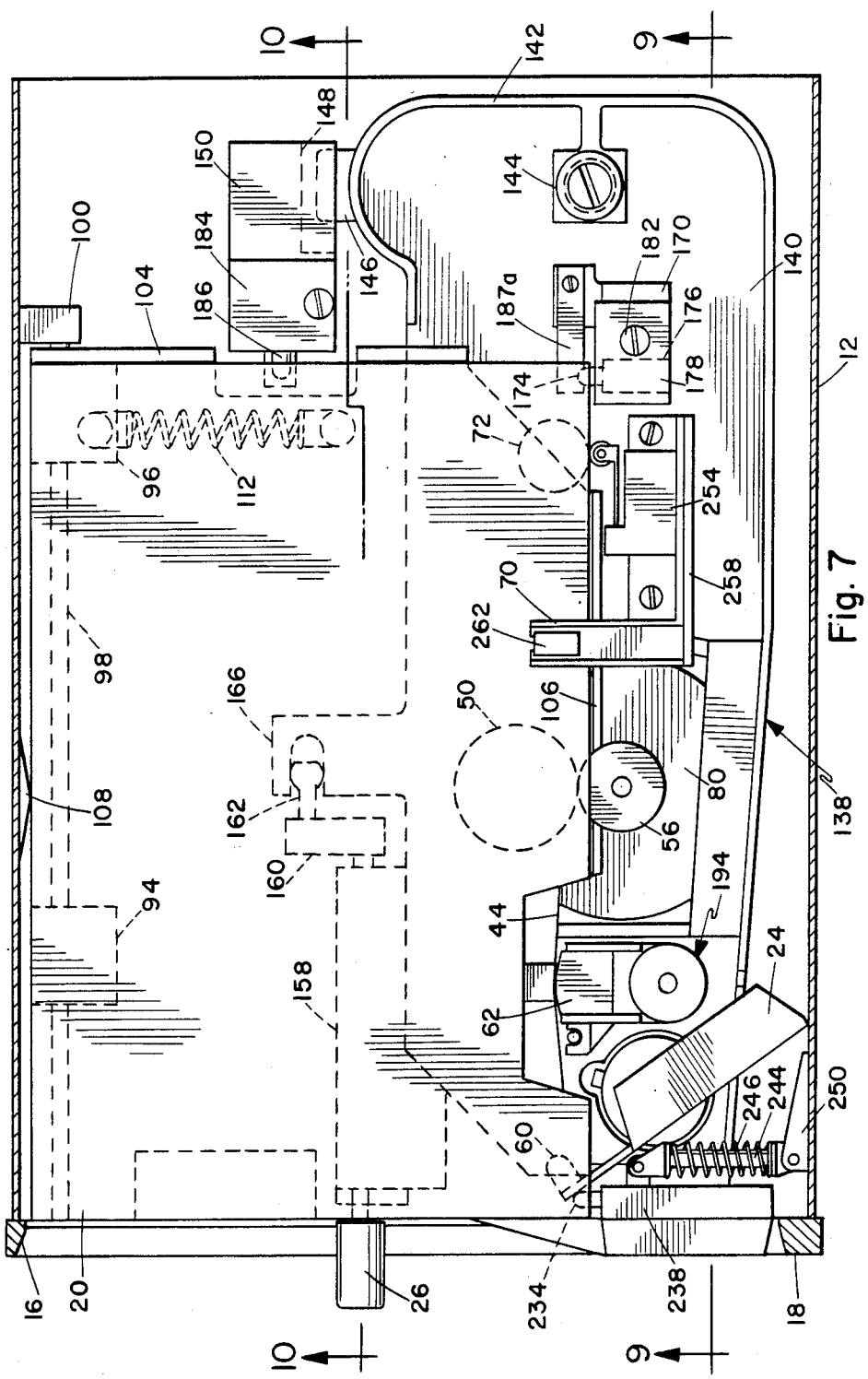
FIG. 7 is a horizontal sectional view of the preferred embodiment of the cartridge tape drive taken along Line 7—7 of FIG. 4.
Figure 8:
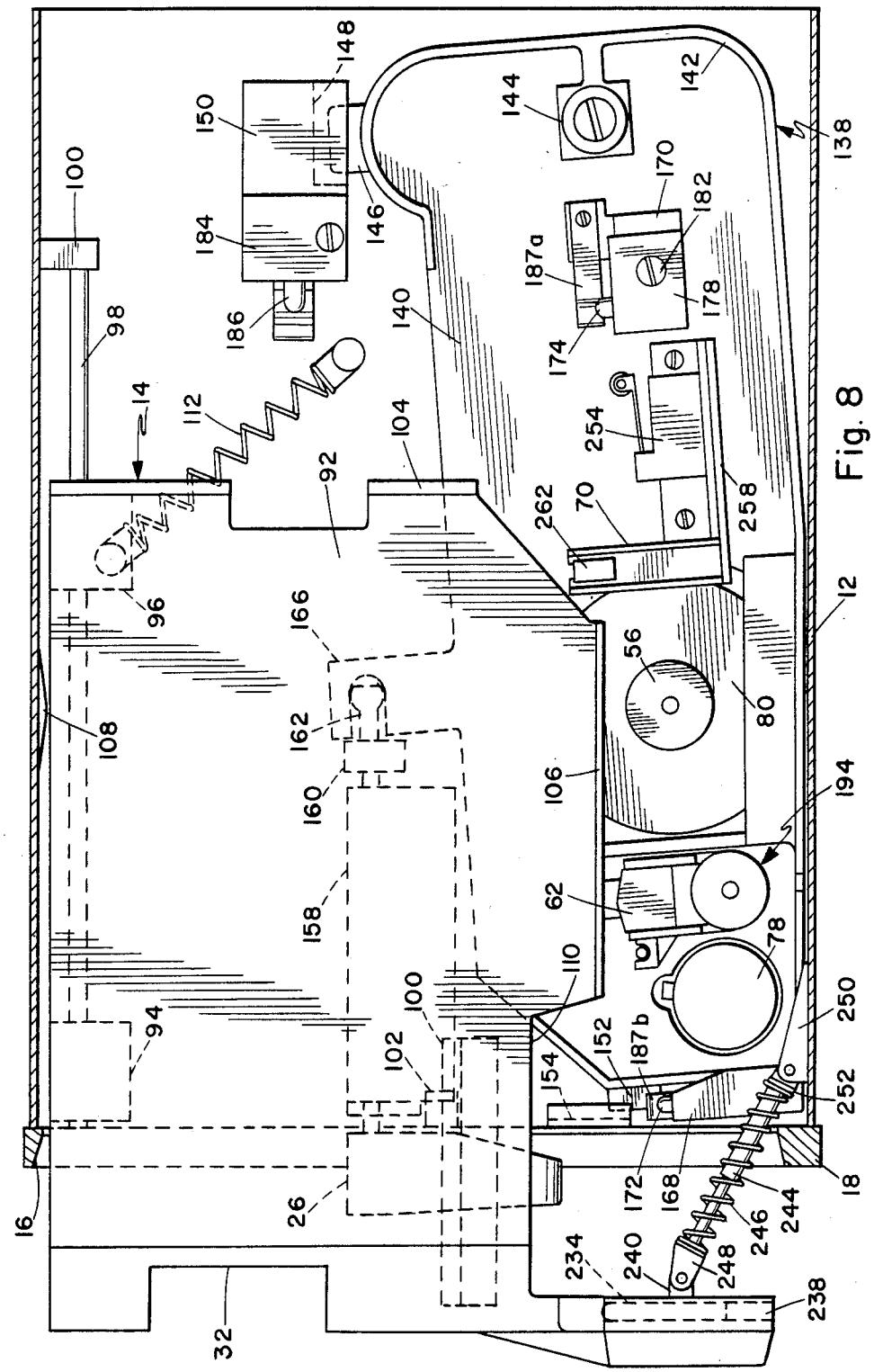
FIG. 8 is a horizontal sectional view of the preferred embodiment similar to FIG. 7, but with the tray extended and the capstan drive mechanism of the tape drive disengaged.
Figure 10:
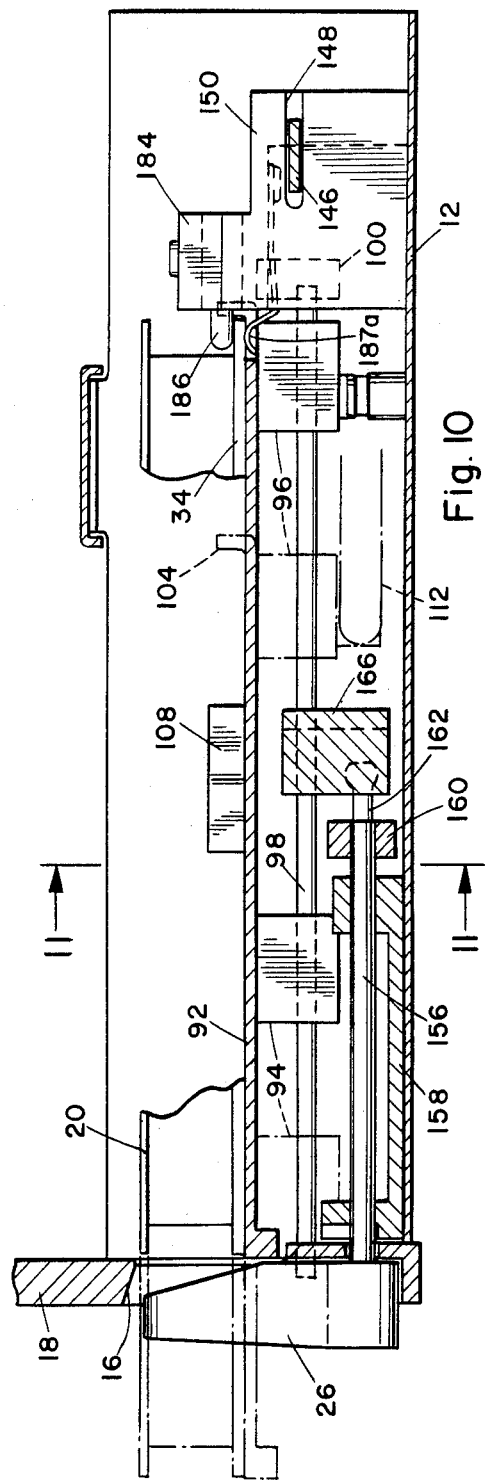
FIG. 10 is a vertical sectional view of the preferred embodiment taken along Line 10—10 of FIG. 7.
Figures 16, 17, 18:
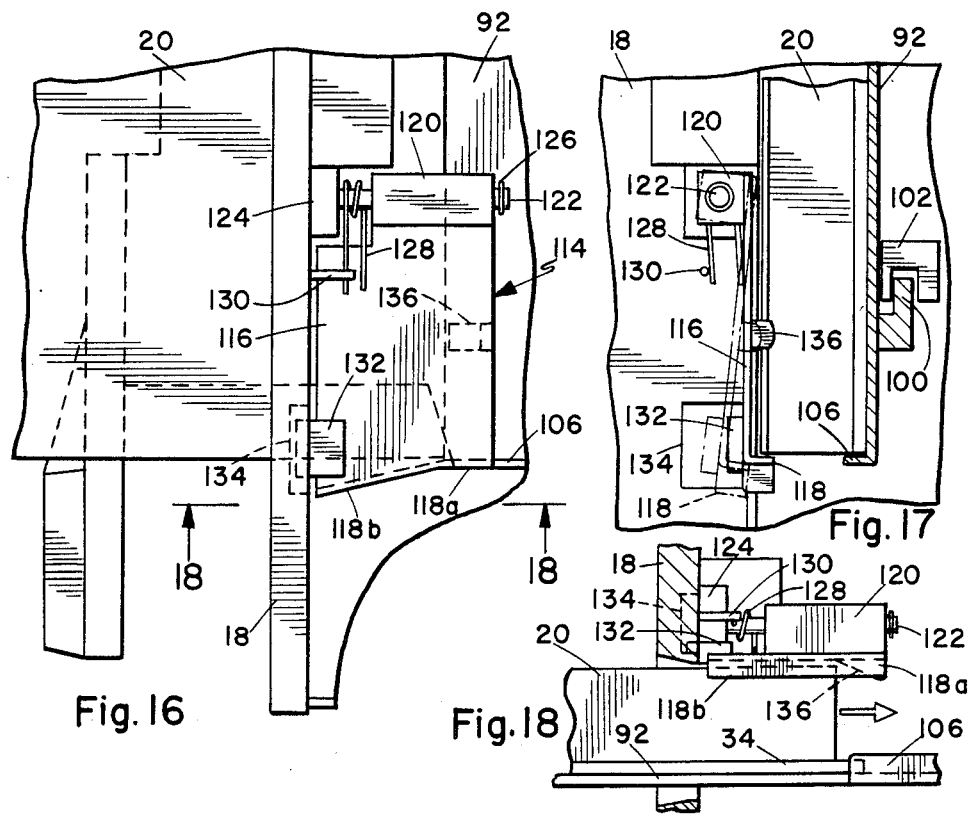
FIG. 16 is an enlarged, fragmentary top plan view of the forward portion of the preferred embodiment of the cartridge tape drive showing the cartridge insertion guide.
FIG. 17 is a rear elevation view of the structure of FIG. 16 showing the insertion guide action.
FIG. 18 is a horizontal sectional view of the cartridge insertion guide taken along Line 18—18 of FIG. 16.

The tray 14 has a horizontal base 92 (FIGS. 7 and 11) having a width and length substantially equal to that of the tape cartridge 20 which it supports. A pair of support blocks 94 and 96 (FIGS. 7, 10 and 11) are attached to the underside of the base 92 at spaced locations adjacent the left hand side edge thereof. These support blocks have horizontal holes therethrough so that they can slide back and forth on a rod 98 (FIGS. 7 and 10). The rear end of this rod is secured to a bracket 100 (FIG. 8) attached to the left side wall of the housing 12. The forward end of the rod 98 is secured to the front panel 18 of the housing. The right side edge of the base 92 of the tray is slidingly supported. Referring to FIGS. 8 and 17, an elongate guide tooth 100 is secured to the underside of the base 92 of the tray 14 and extends forwardly and rearwardly. The projecting portion of the guide tooth 100 slides within a conformably shaped track piece 102 attached to the front panel 18.

The base 92 of the tray is thus supported for sliding movement between a retracted position illustrated in FIG. 7 and a fully extended position illustrated in FIG. 8. The amount that the tray can be extended is limited by the forward one of the spacer blocks 94 which contacts the inside surface of the front panel 18 to limit further extension of the tray as best seen in FIG. 8. The retracted and extended positions of the tray are further illustrated by the retracted and extended positions of the spacer blocks 94 and 96 illustrated in solid and phantom lines, respectively, in FIG. 10.

As best seen in FIGS. 8 and 10, the rear end edge of the base 92 of the tray 14 has an upwardly extending flange 104 and the right side edge of the base has an upwardly extending flange 106. These flanges engage the rear and right side edges of the tape cartridge to help maintain the tape cartridge in proper alignment within the tape drive. The left side edge of the tape cartridge is engaged by a boss 108 (FIG. 8) which extends from the inside surface of the left side wall of the housing 12. The right side edge of the base 92 has a cut-out region 110 (FIG. 8) which coincides with the cut-out region 58 of the tape cartridge when the tape cartridge has been fully inserted into the tray. This cut-out region 110 in the base provides clearance to allow the head 62 to engage the tape as illustrated in FIG. 7.

A coil spring 112 (FIG. 8) is secured at one end to the bottom wall of the housing 12 and at its other end to the support block 96. The spring 112 is shown in its compressed condition in phantom lines in FIG. 7. When the tray 14 is pulled out, the spring 112 expands from its compressed condition, and the force of the spring aids the operator in pulling the tray out. The expanded condition of the spring is illustrated in solid lines in FIG. 8. As will become apparent hereafter, the spring insures that the tray extends all the way so that the cartridge door opening mechanism is clear to enable the cartridge to be pulled out of the tray.

When the tray cartridge 20 is initially inserted into the tray 14, a cartridge insertion guide 114 (FIG. 16) engages the top right side edge of the cartridge and guides the cartridge into engagement with the flange 106 (FIG. 8) of the base 92 of the tray. Shortly after the cartridge insertion guide engages the rearward end of the cartridge, the guide swings upwardly away from the cartridge. Thus, when the cartridge has been completely inserted into the tray, the cartridge insertion guide does not interfere with opening of the cartridge tape access door.

Details of the construction of the cartridge insertion guide are illustrated in FIGS. 16, 17 and 18. The cartridge section guide 114 includes a horizontal panel 116 having a downwardly extending flange 118 which extends from its outer end. The flange has a straight rearward portion 118a (FIG. 16) and an outwardly diverging forward portion 118b. A mounting block 120 is secured to the inside edge of the panel 116. This mounting block rotates on a post 122 whose inner end is rigidly fixed in a boss 124 on to the inside surface of the front panel 116. A retainer 126 holds the block 120 on the post. A torsion spring 128 is wrapped around the post 122. One leg of the torsion spring rests against the upper side of the panel 116 and the other leg of the torsion spring is held by a pin 130 which extends from the inside surface of the front panel 18. The torsion spring thus biases the insertion guide 114 downwardly to its position shown in solid lines in FIGS. 17 and 18.

A tab 132 (FIG. 16) is secured to the top surface of the outer portion of the panel 116 and extends forwardly beyond the forward edge of the panel. The forward end of the tab extends into a vertical slot 134 formed in the inside surface of the front panel 18 and illustrated in phantom lines in FIG. 16. As illustrated in FIG. 18, the lower end of the slot 134 is positioned so that the downward limit of the movement of the tab 132 places the panel 116 in a horizontal position.

The underside of the panel 116 has an inclined cam 136 (FIGS. 16 and 18). When the rearward end of the tape cartridge 20 (FIG. 18) is inserted into the tray through the loading slot in the front panel of the drive, the flange 118 of the cartridge insertion guide engages the side edge of the cartridge to guide the cartridge to the side flange 106 of the base 92 of the tray. Slightly before the end of the tape cartridge reaches the flange 106, the cam 136 engages the end of the tape cartridge and lifts the panel 116 and the flange 118 away from the cartridge. Thus, when the cartridge is fully inserted onto the tray, as illustrated in FIG. 2, the cartridge insertion guide does not obstruct the opening of the access door 24 of the cartridge. The cam 136 may be replaced by a roller wheel.

Referring to FIGS. 7 and 8, within the housing 12 the read/write head 62 and the capstan drive motor 80 are supported on an elongate frame 138. The frame enables these components to be engaged and disengaged with the tape cartridge 20 after it has been inserted onto the tray and the tray has been moved on its retracted position within the housing. The frame 138 extends longitudinally within the housing almost the entire length thereof. The frame 138 consists of a horizontal planar section 140 and a vertical flange 142 (FIGS. 7 and 15) which extends along portions of the peripheral edge of the planar section.

Figure 9:
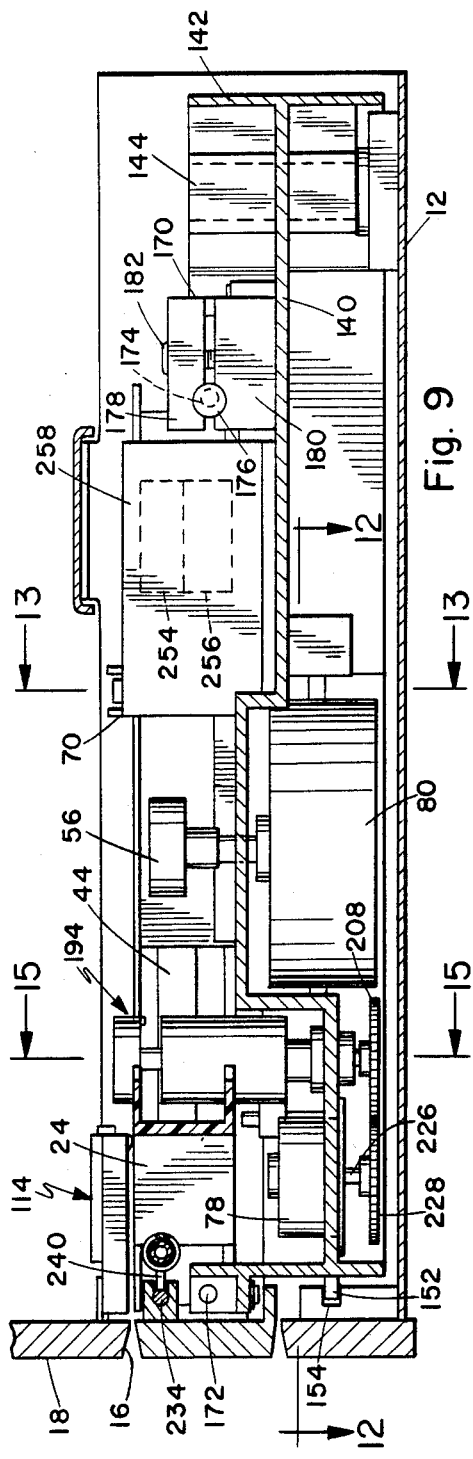
FIG. 9 is a vertical sectional view of the preferred embodiment taken along Line 9—9 of FIG. 7.

The flange 142 imparts strength and rigidity. The rearward end of the frame 138 is rotatably supported by a bearing assembly 144 (FIGS. 7 and 9). Ninety degree rotation of the load lever 26 from its horizontal position illustrated in phantom lines in FIGS. 4 and 8 to its vertical position illustrated in solid lines in FIGS. 3 and 7 causes the frame 138 to pivot or rotate in a clockwise direction. The frame is rotated through approximately four and one-half degrees of rotation from the position illustrated in FIG. 8 to the position illustrated in FIG. 7. The frame 140 rotates beneath the base 92 of the tray 14. When the tray is in its retracted position illustrated in FIG. 7, and a cartridge is loaded on the tray, the capstan drive roller 56 engages the belt capstan roller 50 of the tape cartridge and the head 62 engages the magnetic tape 44.

As the tape cartridge and tray are pushed into the housing of the drive, the tape access door 24 of the cartridge is opened. This opening of the tape access door takes place when the frame 138 is in its disengaged position illustrated in FIG. 8. As will be described hereafter in greater detail, a special mechanism opens the access door as the tray is being pushed in so that the tape access door will swing clear of, and not contact, the head support mechanism. This action is illustrated by the sequence of views consisting of FIGS. 19, 20 and then FIG. 7. Because of the dimensional constraints of opening the tape access door of the 3M cartridge within the industry mechanical form factor, an advantage is achieved by opening the tape access door before the tape cartridge is totally inside the housing.

Means are provided for preventing twisting or out of plane movement of the pivoting frame 138. Specifically, a tab 146 (FIG. 8) extends from the rearward end of the frame and moves horizontally within a slot 148 (FIGS. 8 and 10) formed in the side of a support block 150 mounted to the bottom wall of the housing. A flange 152 (FIGS. 8 and 9) extends horizontally from the forward end of the frame 138 and slides within a horizontal recess 154 (FIG. 9) formed in the inside wall of the front panel 18.

Linkage means are provided for coupling the load lever 26 with the frame 138 so that rotation of the load lever will pivot the frame between its disengagement and engagement positions. Referring to FIG. 10, the load lever 26 is secured to the forward end of a rod 156 which extends through holes in a pair of longitudinally spaced upstanding projections of a support member 158 mounted on the bottom wall of the housing. A crank 160 (FIGS. 10 and 11) is secured to the rearward end of the rod 156. The outer arm 162 of the crank has a rounded end which seats in a rounded vertical socket 164 (FIG. 11) formed in an arm 166 (FIG. 7) extending from the inside side edge of the frame 138. When the load lever 126 is rotated, the rounded end of the outer arm 162 of the crank moves vertically within the socket 164 and causes lateral displacement of the frame 138. The dimensions of the crank, the length of the frame 138 and the relative position of the frame bearing assembly 144 are such that ninety degree rotation of the load lever 26 between the positions illustrated in FIG. 4 rotates the frame through approximately four and one-half degrees of rotation. A rub block 167a abuts the rod 156 and is biased by a compressed spring 167b slidable in a socket 167c. This rub block accommodates crank over travel to ensure rigid seating of the cartridge.

The frame 138 carries a pair of reference locators 168 and 170 (FIG. 8). These locators have cartridge location pins 172 and 174, respectively, which engage and hold down the base plate 34 of the cartridge when the cartridge is fully loaded and the frame is swung to its engagement position as illustrated in FIG. 7. The detent pin 174 (FIG. 9) extends eccentrically from a cylindrical main portion 176 (FIG. 7). This main portion is squeezed between a pair of clamping blocks 178 and 180 held together by a screw 182. The screw 182 may be loosened and the main portion 176 of the pin 174 rotated. This changes the height of the pin and this height adjustment can be used to adjust the tilt of the cartridge on the frame.

Another reference locator 184 (FIG. 7) having similar construction to the reference locator 170 is mounted to the bottom wall of the housing forward of the support block 150. The cartridge location pin 186 of the reference locator 184 engages the rearward edge of the base plate of the cartridge 34. The height of the pin 186 may also be adjusted in a fashion similar to the adjustment of the height of the pin 174. Thus, the reference locators 170 and 184 provide a means for adjusting the tilt of the cartridge with respect to the base 92 of the tray. This adjustment can be used for faactory fine tuning of the azimuth adjustment of the heat with respect to the tape. Leaf springs 187a and 187b (FIG. 8) associated with the reference locators 170 and 184 deflect downwardly when contacted by the base plate 34 of the cartridge and urge the base plate up against the cartridge location pins 174 and 186.

As illustrated in FIGS. 11 and 12, the capstan drive motor 80 is gimbal mounted. Specifically, the frame has a large cut-out region 188 in which the motor 80 is located. Pins 190 extending from opposite sides of the motor, and diametrically with respect thereto, are rotatably supported within recesses formed in the portions of the frame 138 defining the cut-out region 188. A coil spring 192 is connected between the motor and the frame and urges the capstan drive roller 56 against the belt capstan roller 50 of the cartridge.

A special bearing structure is utilized to support the head for vertical reciprocation so that different tracks of data can be recorded onto and read from the tape. Due to the extremely small width of the tape (in the preferred embodiment one-quarter inch) the head must be vertically moved in a very precise manner. It is important that there be very little tilt of slope in the bearing during vertical movement of the head or else azimuth errors will be created. The read/wirte support bearing structure 194 is illustrated in detail in FIG. 15.

Figure 15:
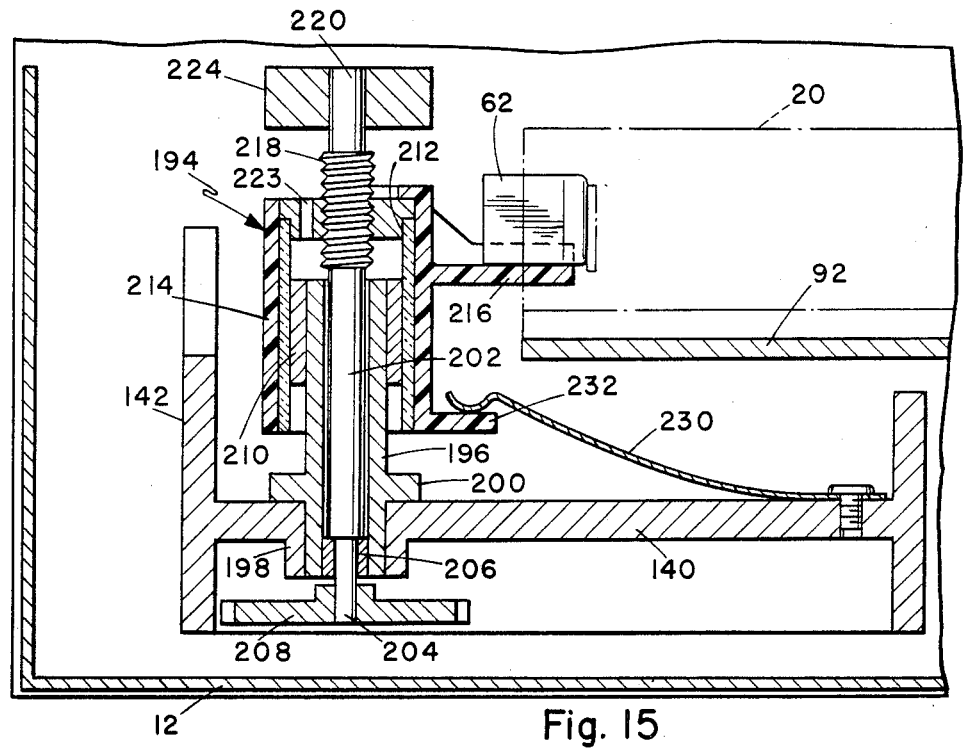
FIG. 15 is a fragmentary, enlarged, vertical sectional view taken along Line 15—15 of FIG. 9 illustrating the bearing structure which supports the read/write head for vertical reciprocation.

Referring to FIG. 15, a cylindrical sleeve 196 has its lower end seated within a receptacle 198 formed in the forward portion of the pivoting frame 138. The vertically extending sleeve 196 has a horizontal circumferential flange 200 which is firmly seated against the planar section 140 of the frame. A metal shaft 202 extends vertically within the sleeve 196 and is vertically spaced from the inside walls of the sleeves. A smaller diameter section 204 of the shaft is rotatably supported in a bearing 206 rigidly held within the lower end of the cylindrical sleeve 196. A gear 208 is rigidly connected to the lower end of the smaller diameter section 204 of the shaft. A graphite piston 210 is tightly fit around the upper end of the sleeve 196. A glass cylinder 212 surrounds the piston and is vertically reciprocable with respect to the piston.

Preferably the outside diameter of the graphite piston 210 (FIG. 15) is extremely close to the inside diameter of the glass cylinder 212. This is to that there will be almost no tilt of the glass cylinder with respect to the graphite piston during relative vertical movement. This in turn insures that there will be very little, if any, azimuth error with respect to the tape in the cartridge. Graphite pistons and glass cylinders manufactured to very close tolerances are available from Airpot Corporation. As an example, parts of this type are available which will insure that the tilt in 0.25 inches of graphite is a maximum of fifty microinches, producing less than one minute of arc.

A plastic cylinder 214 (FIG. 15) is tightly fit over the glass cylinder 212 and has a shelf 216 extending horizontally therefrom on which the read/write head 62 is securely mounted. The coefficients of thermal expansion of the graphite piston 210, glass cylinder 212 and plastic cylinder 214 are matched to minimize bearing inaccuracies. The upper end of the shaft 202 has a threaded segment 218 and a smooth upper end segment 220. A nut 222 is threadably engaged with the threaded segment 218 of the shaft and is snugly secured into the upper ends of the glass cylinder 212 and the plastic cylinder 214. An air bleed hole 223 extends through the nut 222. A stop 224 is rigidly secured to the smooth upper end segment 220 of the shaft.

Referring to FIG. 9, the stepper motor 78 is mounted on the upper side of the frame 138 forward of the bearing support structure for the magnetic head. The output shaft of the stepper motor extends vertically downwardly through a hole in the frame. A gear 228 rigidly secured to the end of the stepper motor output shaft 226 meshes with the gear 208 on the lower end of the shaft 202 (FIGS. 9 and 15). When the stepper motor is energized, the shaft 202 of the bearing support structure 194 is rotated, causing the glass cylinder 212, plastic cylinder 214, and read/write head 62 to travel vertically.

A leaf spring 230 (FIG. 15) has one end secured to the planar section 140 of the frame 138. The other end of the leaf spring presses downwardly on a shelf 232 which extends horizontally from the lower end of the plastic cylinder 214 which carries the read/write head 62. This leaf spring serves to prevent any slop or slight movement otherwise possible between the nut 222 and the threaded segment 218 of the shaft from introducing any inaccuracies in positioning of the read/write head 62.

Details of the tape access door opening mechanism are illustrated in FIGS. 19 and 20. A pin 234 is mounted within a horizontal slot 236 formed within a block 238 mounted to the rear side of the side panel 22 of the tray 14. As best seen in FIG. 9, the slot 236 has a rounded portion within which the body of the pin can slide. The slot also has a groove portion in which an ear 240 (FIGS. 9 and 19) connected to the pin 234 can slide. As best seen in FIG. 19, the pin 234 is positioned so that its forward end can engage the rearward end 24a of the tape access door of the cartridge 20 when the cartridge has been fully inserted onto the tray 14. This rearward end 24a of the tape access door is forward of the hinge assembly 60 about which the access door pivots.

Linkage means are provided for connecting the pin 234 (FIG. 19) with the housing so that during inward movement of the tray to its retracted position, the pin 234 will push against the rearward end 24a of the tape access door to open the same. Referring to FIG. 19, the linkage means of the access door opening mechanism includes a telescopic element 244 which is surrounded by a coil spring 246. One end of the telescopic element 244 is attached to the ear 240 of the pin 234 by a pivotal connector 248. The other end of the telescopic element is connected to another ear 250 extending from the side wall of the housing 12 via a pivotal connector 252. The coil spring 246 is slightly compressed between the pivotal connectors 248 and 252 when the tray is in its extended position illustrated in FIG. 8.

The operation of the tape access door opening mechanism will now be better understood by a review of the loading sequence. Initially, the cartridge is inserted into the tray 14 as illustrated in FIG. 2 when the tray is in its extended position. Thereafter, the operator pushes on the forward end of the cartridge to push the tray to its retracted position in which both the tray and the cartridge are entirely within the housing. FIG. 19 illustrates the cartridge 20 fully inserted onto the tray 14 with the tray in its extended position and the tape access door 24 closed.

Inward pushing of the tray as illustrated by the arrow in FIG. 20 causes the telescopic element 244 to initially retract in length somewhat. However, the force of the compressed coil spring 246 gradually moves the pin 234 into contact with the rearward end 24a of the tape access door 24. This causes the tape access door 24 to open as the tray is being pushed inwardly, the opening of the tape access door being indicated by the curved arrow in FIG. 20.

It should be noted that when the tray and the cartridge are being pushed into the drive, the frame 138 and thus the read/write head and the capstan drive mechanism carried thereby are in their disengaged positions, adjacent the sidewall of the housing. The various structures in the drive are dimensioned so that the tape access door follows a path which will just clear the bearing support structure 194 and the head 62. When the tray and cartridge have been fully inserted into the drive, the tape access door in in the position illustrated in FIG. 7.

The unloading sequence is as follows. Initially the load lever 26 is rotated to the horizontal position shown in phantom lines in FIG. 4. This leaves the cartridge loading slot 16 unobstructed. Rotation of the load lever 26 to its horizontal position causes the frame 138 to rotate counter-clockwise to its disengaged position illustrated in FIG. 8. This moves the head and capstan drive clear of the cartridge. Thereafter, as the tray is pulled manually out of the housing, the pin 234 slides to the right in FIG. 8, so that the cartridge can be withdrawn.

The file protect sensor 76 (FIG. 6) is provided by a MICROSWITCH 254 (FIG. 9). The cartridge in place sensor 82 (FIG. 6) is provided by a MICROSWITCH 256 (FIG. 9) both of the microswitches 254 and 256 are mounted on and carried by the pivoting frame 138.

The EOT/BOT sensing mechanism 70 (FIG. 6) is carried by the frame 138 as illustrated in FIG. 7. Details of the EOT/BOT sensing mechanism 70 are illustrated in FIG. 13. This mechanism includes a housing 258 having a beam 260 which extends over the top of the cartridge 20 adjacent the mirror 66 (FIG. 5) mounted therein. Referring again to FIG. 13, radiation from an infrared light emitting diode 262 is projected through a top transparent window 264 in the top panel of the cartridge 20. This radiation is reflected off of the angled mirror 66 through perforations 266 (FIG. 14) in one end of the length of magnetic tape 44 in the cartridge. Radiation which passes through the perforations in the magnetic tape passes through the front transparent window 68 in the side wall of the cartridge 20. The radiation which passes through the window 68 passes through upper and lower holes 272 and 274 in the side wall of the housing 258. Radiation thus transmitted is detected by upper and lower photo detectors 276 and 278 mounted on the opposite vertical side wall of the housing 258. This sidewall is a small PC board. The various patterns of perforations on the tape and how they are detected as indicating the end of tape, beginning of tape, or early warning holes, is done in conventional fashion.

Having described a preferred embodiment of the cartridge tape drive of the present invention, it should be understood that variations and modifications will occur to those skilled in the art. Accordingly, the protection afforded the invention should be limited only in accordance with the scope of the following claims.

We claim:

1. A drive for an elongate, rectangular tape cartridge having an access door along a side edge thereof, comprising:

an elongate housing having a slot opening at a transversely extending end of the housing, the slot being dimensioned to have the cartridge longitudinally inserted therein so that the side edge of the cartridge is substantially parallel to a longitudinally extending side of the housing means for supporting the cartridge within the housing when the cartridge is inserted in the slot, including a tray and means for supporting the tray within the housing for longitudinal movement from a retracted position in which the tray is substantially contained within the housing to an extended position in which a portion of the tray extends through the slot;

means for opening the access door of the cartridge when the cartridge is inserted in the slot;

a magnetic head;

means for moving the magnetic head within the housing between operative engagement and disengagement with a length of tape in the cartridge exposed by opening the access door when the cartridge is inserted in the slot; and means for moving the length of tape within the cartridge past the magnetic head.

2. A drive according to claim 1 and further comprising a cartridge insertion guide mounted within the housing above the tray and which is engaged and moved by the cartridge during insertion of the cartridge onto the tray.

3. A drive according to claim 1 wherein the means for opening the access door of the cartridge includes a pin, means for mounting the pin adjacent a forward end of the tray for transverse sliding movement toward and away from a rearward end of the access door of the cartridge when the cartridge is supported on the tray, and linkage means for connecting the pin and the housing so that movement of the tray to its retracted position will cause the pin to engage the rearward end of the access door to open the access door.

4. A drive for an elongate, rectangular tape cartridge having an access door along a side edge thereof, comprising:

an elongate housing having a slot opening at a transversely extending end of the housing, the slot being dimensioned to have the cartridge longitudinally inserted therein so that the side edge of the cartridge is substantially parallel to a longitudinally extending side of the housing means for supporting the cartridge within the housing when the cartridge is inserted in the slot;

means for opening the access door of the cartridge when the cartridge is inserted in the slot;

a magnetic head;

means for moving the magnetic head within the housing between operative engagement and disengagement with the length of tape in the cartridge exposed by opening the access door when the cartridge is inserted in the slot, including an elongate frame extending longitudinally within the housing, means for mounting the head to the frame adjacent a forward end of the frame, and means for pivotally mounting a rearward end of the frame to the housing; and means for moving the length of tape within the cartridge past the magnetic head.

5. A drive for an elongate, rectangular tape cartridge having an access door along a side edge thereof, comprising:

an elongate housing having a slot opening at a transversely extending end of the housing, the slot being dimensioned to have the cartridge longitudinally inserted therein so that the side edge of the cartridge is substantially parallel to a longitudinally extending side of the housing means for supporting the cartridge within the housing when the cartridge is inserted in the slot;
means for opening the access door of the cartridge when the cartridge is inserted in the slot;
a magnetic head;
means for moving the magnetic head within the housing, including a manually actuated lever rotatable on a front panel of the housing from an unlocked position in which the lever is clear of the slot and in which the head is disengaged from a length of tape in the cartridge to a locked position in which the lever blocks the slot and in which the head is engaged with the length of tape; and
means for moving the length of tape within the cartridge past the magnetic head.

6. A drive for an elongate, rectangular tape cartridge having an access door along a side edge thereof, the cartridge having a length of approximately six inches and a width of approximately four inches, and the door increasing the width of the cartridge to approximately five and three-quarter inches when fully open, comprising:
a rectangular housing having a front panel with a slot dimensioned to have the cartridge longitudinally inserted therein so that the side edge of the cartridge is substantially parallel to a longitudinally extending side of the housing, the housing having a width of approximately five and three-quarter inches with the front panel extending across the width of the housing, and the housing having a length of approximately eight inches;
means for supporting the cartridge within the housing when the cartridge is inserted in the slot;
means for opening the access door of the cartridge when the cartridge is inserted in the slot;
a magnetic head;
means for moving the magnetic head within the housing between operative engagement and disengagement with a length of tape in the cartridge exposed by opening the access door when the cartridge is inserted in the slot; and
means for moving the length of tape within the cartridge past the magnetic head.

7. A drive for an elongate, rectangular tape cartridge having an access door along a side edge thereof, comprising:
a housing having a front panel;
an elongate tray dimensioned to have the cartridge inserted longitudinally thereon;
means for supporting the tray within the housing for longitudinal movement from a retracted position in which the tray is substantially contained within the housing to an extended position in which a portion of the tray extends through a slot in a front panel of the housing, the side edge of the cartridge being substantially parallel to a longitudinally extending side of the housing when the cartridge is longitudinally inserted on the tray;
means for opening the access door of the cartridge when the cartridge is inserted on the tray and the tray is moved from its extended position to its retracted position;
a magnetic head;
a capstan drive; and
means for moving the head and the capstan drive within the housing between operative engagement and disengagement with the cartridge after the cartridge has been inserted on the tray and the tray has been moved to its retracted position.

8. A drive according to claim 7 wherein the means for moving the head and the capstan drive includes a manually actuated lever rotatable on the front panel of the housing from an unlocked position in which the lever is clear of the slot and in which the head and capstan drive are disengaged from the cartridge to a locked position in which the lever blocks the slot and in which the head and capstan drive are engaged with the cartridge.

9. A drive according to claim 7 and further comprising means for adjustably tilting the cartridge relative to the head.

10. A drive according to claim 7 and further comprising means for vertically moving the head to a plurality of selected vertical positions with respect to a length of tape within the cartridge.

11. A drive according to claim 10 wherein the means for vertically moving the head includes a bearing having a fixed graphite piston and a glass cylinder surrounding the piston and vertically reciprocable with respect to the piston, and means for supporting the head on the cylinder.

12. A drive according to claim 11 wherein the means for vertically moving the head further comprises means for rigidly mounting the graphite piston, a shaft extending through the piston and having a threaded portion, a bearing for rotatably supporting the shaft, a nut mounted to one end of the glass cylinder and threadably engaged with the threaded portion of the shaft, a stepper motor, means for providing a driving connection between the stepper motor and the shaft, and means for downwardly biasing the nut with respect to the threaded portion of the shaft.

13. A drive according to claim 7 and further comprising a cartridge insertion guide mounted within the housing above the tray and which is moved by the cartridge during the insertion of the cartridge onto the tray.

14. A drive according to claim 7 wherein the means for opening the access door of the cartridge includes a pin, means for mounting the pin adjacent a forward end of the tray for transverse sliding movement toward and away from a rearward end of the access door of the cartridge when the cartridge is supported on the tray, and linkage means for connecting the pin and the housing so that movement of the tray to its retracted position will cause the pin to engage the rearward end of the access door to open the access door.

15. A drive according to claim 7 wherein the means for moving the head and the capstan drive includes an elongate frame extending longitudinally within the housing, means for mounting the head and the capstan drive to the frame adjacent a forward end of the frame, and means for pivotally mounting a rearward end of the frame to the housing.

16. A drive according to claim 7 wherein the housing is rectangular and has a width of approximately five and three-fourth inches with the front panel extending across the width of the housing, the housing has a length of approximately eight inches, and further wherein the cartridge has a length of approximately six inches, a width of approximately four inches, and a door which increases the width of the cartridge to approximately five and three-fourth inches when fully open.

17. A drive for an elongate, rectangular cartridge having a length of tape which may be wound between a pair of reels in the cartridge, the cartridge having a generally planar top cover and a generally planar base plate, the top cover and the base plate being substantially parallel to each other, the cartridge further having an access door along a side edge of the cartridge which may be opened to expose a segment of the tape extending between the reels by pivoting the door about a hinge assembly having a rotational axis which extends perpendicular to the top cover and the base plate, the cartridge having a length of approximately six inches, a width of approximately four inches, and an access door dimensioned to increase the width of the cartridge to approximately five and three-quarter inches when fully open, the drive comprising:

an elongate housing having a slot opening at a transversely extending end of the housing, the slot being dimensioned to have the cartridge longitudinally inserted therein so that the side edge of the cartridge is substantially parallel to a longitudinally extending side of the housing, the housing being dimensioned to fit within a box which has a width of approximately five and three-quarter inches and a length of approximately eight inches;

means for supporting the cartridge within the housing;

means for opening the access door of the cartridge when the cartridge is inserted in the slot;

a magnetic head;

means for moving the head along an arcuate path within the housing to thereby engage and disengage the segment of the tape in the cartridge when the access door has been opened, and means for moving the length of tape between the reels in the cartridge past the magnetic head.

* * * * *

UNITED STATES PATENT AND TRADEMARK OFFICE
CERTIFICATE OF CORRECTION

PATENT NO. : 4,573,091

DATED : February 25, 1986

INVENTOR(S) : William M. Barton, Jr. et al.

It is certified that error appears in the above-identified patent and that said Letters Patent is hereby corrected as shown below:

On the face sheet of the patent, in the right hand column, under the heading "FOREIGN PATENT DOCUMENTS", after "822012 11/1974", change "France" to --Belgium--.

Column 8, line 65, change "faactory" to --factory--.

Column 8, line 66, change "heat" to --head--.

Signed and Sealed this

Sixteenth Day of February, 1988

*Attest:*

DONALD J. QUIGG

*Attesting Officer*  *Commissioner of Patents and Trademarks*